T. BROWN & T. JARVIS, Jr.
Improvement in Fishing-Seine Floats.

No. 127,218. Patented May 28, 1872.

Witnesses,
S. N. Piper
L. N. Möller

T. Brown & T. Jarvis, Jr.
by their attorney
R. H. Eddy

UNITED STATES PATENT OFFICE.

THEODORE BROWN, OF WELLFLEET, AND TIMOTHY JARVIS, JR., OF BOSTON, MASSACHUSETTS.

IMPROVEMENT IN FISHING-SEINE FLOATS.

Specification forming part of Letters Patent No. 127,218, dated May 28, 1872.

*To all persons to whom these presents may come:*

Be it known that we, THEODORE BROWN, of Wellfleet, of the county of Barnstable and State of Massachusetts, and TIMOTHY JARVIS, Jr., of Boston, of the county of Suffolk and State aforesaid, have invented a new and useful Fishing-Seine Float; and do hereby declare the same to be fully described in the following specification and represented in the accompanying drawing, of which—

Figure 1:
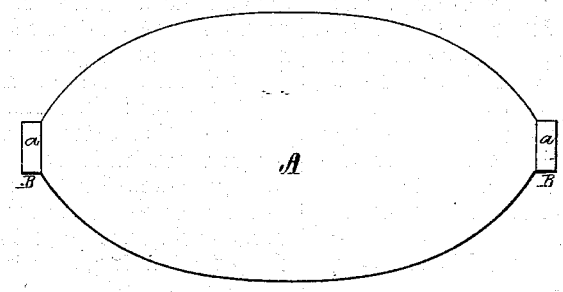
Figure 2:
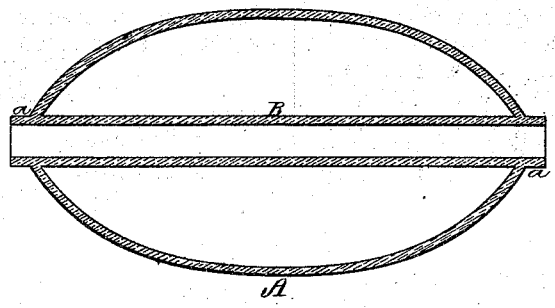

Figure 1 is a side view, and Fig. 2 a longitudinal section of such float.

It is designed to take the place of the cork float as ordinarily made and used, and besides is more buoyant.

It consists of a hollow ellipsoidal-shaped vessel, A, and a tube, B, the latter being extended through the vessel A from end to end, and also beyond such end a short distance, so as to form ears or projections $a\ a$, all being made of India rubber, (vulcanized,) so as to be air and water tight. The rope for holding the float to the seine is to be run through the axial tube, and the latter may or is to be secured to the rope by cords going around the ears or projections, so as to contract them upon such rope. By having the tube extend entirely through the vessel the latter is made air and water tight even when the float is loose on a line. A float so made we believe to be a new or improved manufacture for the purpose for which it is used or intended for use.

We are aware that a hollow buoy composed of two metallic frustums joined together at their larger bases, and having a tube going through them, and connected at its ends to their smaller bases, has been made or used before our invention, it being described in the rejected application of Gladding, filed in the Patent Office on January 25, 1868.

We make no claim to such a buoy or float, it not having, like our seine-float, the elastic ears or extensions of the tube beyond the ends of the air-vessel, such elastic projections being for the purpose hereinbefore explained.

We therefore claim as our invention—

The vulcanized India-rubber or elastic air-tight seine-float, having the elastic ears or projections $a\ a$ arranged and combined with the tube B and the case or vessel A, all being substantially as described.

THEODORE BROWN.
TIMOTHY JARVIS, JR.

Witnesses:
R. H. EDDY,
J. R. SNOW